Figure 1:
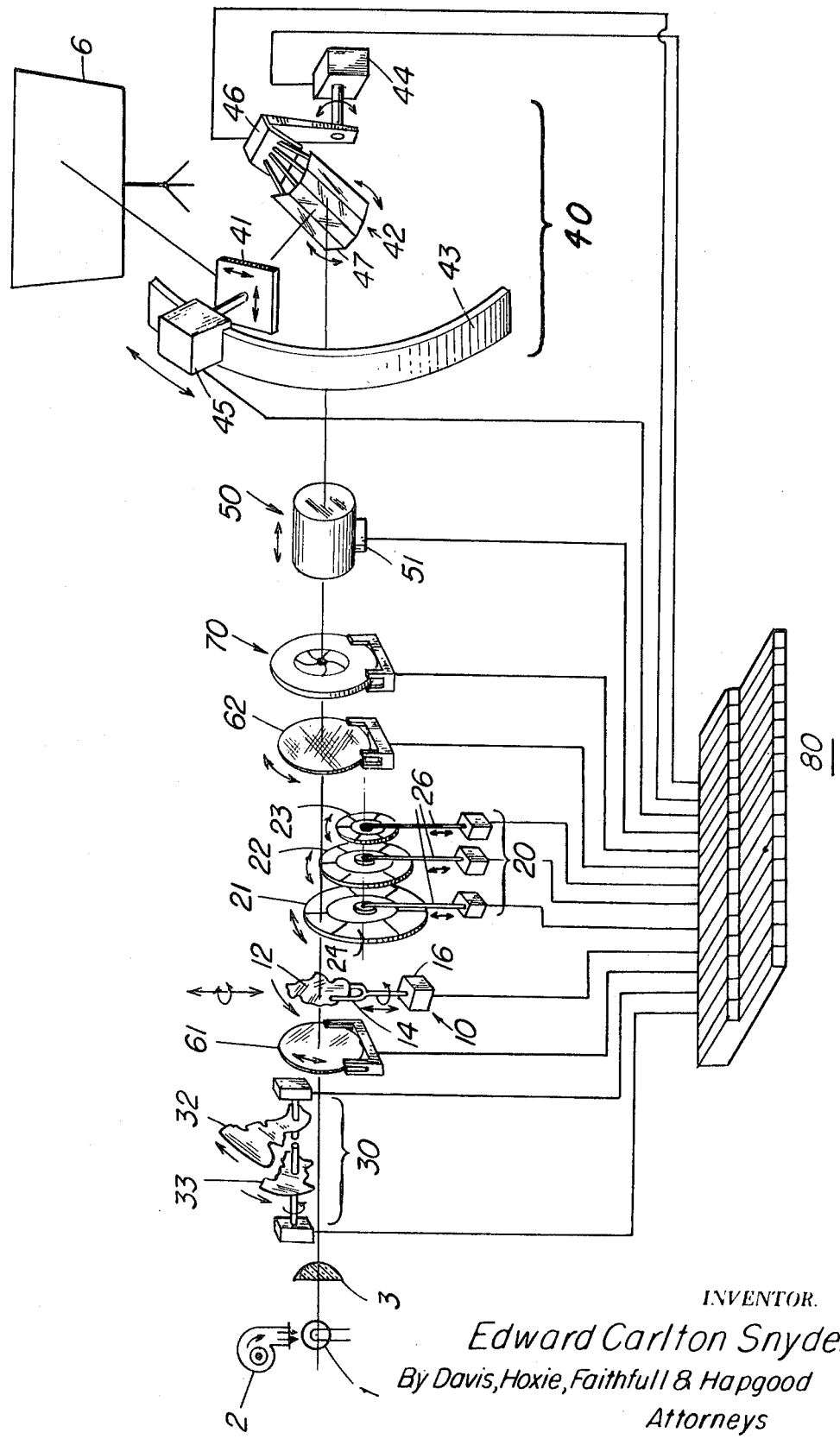

United States Patent

[11] 3,600,076

| [72] | Inventor | Edward Carlton Synder |
| | | 127 W. 96th St., New York, N.Y. 10025 |
| [21] | Appl. No. | 872,189 |
| [22] | Filed | Oct. 29, 1969 |
| [45] | Patented | Aug. 17, 1971 |

[54] LIGHT BRUSH
9 Claims, 1 Drawing Fig.

[52] U.S. Cl. .................................................... 353/20,
353/98, 353/1
[51] Int. Cl. ................................................... G03b 21/28,
G03b 21/00
[50] Field of Search ................................. 353/2, 98,
31; 350/520; 240/3.1, 10.1; 272/10, 10.1

[56] References Cited
UNITED STATES PATENTS

| 2,725,230 | 11/1955 | Weintraub .................. | 240/3.1 X |
| 3,119,565 | 1/1964 | Nottingham .................. | 353/1 X |

FOREIGN PATENTS

| 1,257,721 | 2/1960 | France ........................ | 353/1 |

Primary Examiner—Harry N. Haroian
Attorney—Davis, Hoxie, Faithfull and Hapgood

ABSTRACT: An optical projection device is provided with means to create and vary a light image. The image can be varied in form, number, color, attitude, focus, and illumination intensity. The image can be caused to move about and caused to vibrate in intensity. Each of the image variables is controlled by a keyboard such that a particular image status can be recalled by proper key manipulation. The resulting image variations are useful as a form of artistic expression.

INVENTOR.
*Edward Carlton Snyder*
By Davis, Hoxie, Faithfull & Hapgood
Attorneys

LIGHT BRUSH

The present invention relates to an instrument for projecting light and varying the shape, form, color, and intensity of the image as a form of artistic expression. More particularly, the invention relates to an improved apparatus for showing a plurality of successive images which change in color, brilliance and form in response to a control keyboard. While the instrument is simple in construction, it offers that artist sensitive and flexible control over and extensive range of imagery. The present invention provides a projector which projects a succession of static or moving colored metamorphic images under the control of a keyboard manipulated by the artist. The instrument provides the artist with sufficient image control variables to make a composition analogous to a painting, but having the further dimension afforded by time sequence. This further dimension of time allows the instrument to be used in concert with music thereby permitting an artistic expression related to music.

The optical system of the instrument includes the usual source of light, cooling fan, condensing lenses, and projection lenses. An image forming device located near the focus of the projection lens converts the beam of light into an image suitable for projection onto a screen. The attitude of the image forming device with respect to the light beam can be changed to render the image metamorphic. An image vibrato device provides cyclic image intensity variations and slight location shifts which are variable in frequency to impart a vibrato effect. Differential color is imparted to different areas of the image by polarizing filters. The overall color of the image is determined by color filters which can be positioned with respect to the optical axis of the instrument to color portions of the image. An image multiplying device is provided in the path of the beam of light to selectively disassociate a unitary image into a plurality of similar images. The intensity or brilliance of the image can be varied. The position of the image on the screen can be varied by an aiming device. Each of these image variables is controlled in response to a keyboard. Thus, the form, position, color, stability, brilliance, and number of images are under keyboard control so that an artist can exercise command over each variable independently and can recall a particular set of variables to produce a composition based upon sequential variation of the image.

The drawing is a schematic view of apparatus of the present invention shown the various image affecting elements in simplified form.

Referring now to the drawing, there is shown a source of light 1 which may be a conventional bulb or arc, a conventional condensing lens system 3, and a fan 2 for cooling both. A conventional projection lens system 50 is provided with a keyboard controlled remote focusing device 51. Also shown are image forming means 10, a color device 20, an intensity vibrato device 30, an image aiming and multiplication system 40, polarizing filters 61 and 62, and an overall light intensity control device 70. Each of these image affecting devices is operatively connected to a keyboard 80.

The image to be projected is created by an image forming device 10, which, in the preferred embodiment, is a randomly faceted transparent crystal 12 which breaks up the light beam which emerges from the condenser 3 into a plurality of light beams of varying intensity and form by refraction and internal reflection. The crystal 12 is mounted in a carrier 14 which is rotatively advanced as well as moved up and down and sideways by an actuator 16 in response to keyboard commands. Movement of the crystal 12 causes the projected image to change in appearance. The different attitudes of the crystal with respect to the impinging beam of light produce different shapes and gradations of image. A change in attitude of the crystal 12 while illuminated will cause transition of the image to occur with motion on the screen. If the light is blocked by a mask during transition of crystal attitude, a sequence of static images will appear on the screen. Rapid change with light masking will create the effect of apparent motion not unlike a motion picture. Change without light masking will create real motion of the image. This masking of light is a capability of the intensity vibrato device 30 discussed below.

A randomly faceted transparent crystal is not the only means available to produce desirable images. The beam of light can be reflected from a liquid surface or from a reflecting surface on a flexible film which surfaces are agitated by air currents or by mechanical or sonic vibrators. Where the liquid is one which can readily be solidified, such as wax or plastic, the surface configuration and the resulting image can be fixed at will by solidification. Such surfaces can also be used as reflectors of images formed by other means such that a change in reflector surface configuration will cause a change in the reflected image. Another form of image forming means is a faceted reflector such as crumpled metalic foil which can be moved about and deformed to vary the image. The image formed by image forming means 10 is given color by color filter means 20 which comprise several color filter wheels 21—23. The wheels are fashioned with transparent colored peripheries 24 of glass, plastic, or gelatin. The color of peripheral filters 24 changes circumferentially of the wheels. Such color change can be gradual or can be accomplished by discrete arcuate segments of filter material. Rotation of each wheel changes the color which it contributes to the image. Each wheel is independently movable laterally of the optical axis so as to provide the artist with the ability to add or remove the color contribution of that particular wheel. Further, the color filter material can be graduated in color density or saturation in a radial direction such that the color saturation of the projected image is determined by the lateral position of the wheel with respect to the optical axis. Because the beams of light which comprise the image to be projected are finite in size and are discretely located, the lateral position of a particular color wheel will determine the portion of the image to be colored by that wheel. In other words, not all of the image need be colored by a particular wheel. The remainder of the image can be colored by another wheel.

Rotation and lateral positioning of the wheels is accomplished by independent mounting of the wheels 21—23 on support arms 26 which move transversely of the optical axis in response to keyboard commands. Rotation of the wheels can be accomplished by means such as a belt drive for each wheel.

Thus, the artist can control color hue and saturation and can also determine which portions of the image are to be colored. Subtle color variation as well as plural areas of different color are available by virtue of the plurality of wheels which can be used independently or additively.

Image coloration is also achieved by means of polarizing filters 61 and 62. These are filters of well-known properties which convert randomly oriented light into light having a predominant axis of polarization by filtering out light not aligned with the polarization axis of the filter. Polarizing filter 61 is used to polarize the light impinging on crystal 12. Many transparent materials such as glass or plastics display the ability to partially polarize light. When such materials are illuminated with polarized light, the light transmitted through the material varies in intensity dependent upon the degree of alignment of the local axis of polarization of the material with the axis of polarization of the impinging light. When that transmitted light is passed through a second polarizing filter 62, the local intensity variations become color variations. The degree of this effect and the colors produced by it can be varied by rotation of the polarizing filter relative to each other and to the crystal 12. The result in the instrument of the present invention is to provide different portions of the image with different colors. Control over this differential coloration of the image is achieved by independent rotation of the filters 61 and 62 in response to the keyboard 80.

The image vibrato device 30 provides rapid fluctuation of the intensity of the projected image. The rate of such fluctuation is adjustable. This device also permits extinction of the image when desired. This extinction capability permits transition of crystal 12 attitude with no image motion. The vibrato device 30 is designed to vary the intensity of different portions of the image in differing phase to provide the image with the appearance of vibratory motion.

Image vibrato device 30 comprises two oppositely rotating masks 32 and 33. The peripheral shape of masks 32 and 33 is such that as the mask pass each other in overlapping fashion, irregular apertures are formed which increase and decrease in size as the masks relatively rotate. Light illuminating the image forming means 10 is restricted to that passing through the apertures. The appearing and disappearing apertures are located at differing radial displacements from the optical axis such that the portion of the image forming means 10 which is illuminated changes as the masks rotate. The frequency with which the apertures appear and disappear is determined by the relative speed of rotation of masks 32 and 33. The angular position of a particular aperture depends upon the phase relationship of the masks. A particular aperture will appear at the same angular location if both masks are rotated at identical speeds in opposite directions or if one mask is stopped. That aperture will advance or retreat in angular position at a rate determined by the difference in mask rotation speeds. By exercising independent speed control over masks 32 and 33, the artist can produce a steady intensity vibrato effect or can, by suitable adjustment, cause the vibrato effect to have an apparent circular motion, or he can create a random effect. He can also vary the frequency of these effects.

The peripheral shape of the masks 32 and 33 is such that they can be arrested in a completely overlapping mode to block all light. This ability to block all light is useful in conjunction with the image forming means 10 to permit the projection of a rapid sequence of static images. This is done by changing the attitude of crystal 12 of image forming means 10 while the light is blocked. A sufficiently rapid sequence of small attitude changes will produce an effect of image motion similar to the apparent motion of animated motion pictures.

Since the apertures appear at differing radial and angular positions with respect to the crystal 12, the image produced will vary slightly because of the variation in the attitude of the light impinging on the crystal 12. This causes a cyclic variation in the form of the image as well as a cyclic variation in the intensity or brilliance of portions of the image. Each of these effects contributes to the vibrato effect wherein an essentially static image is imbued with a dynamic content similar to the vibrato effect of music. The above described apparatus which constitutes the vibrato device provides the artist with subtle control over the frequency and character of the vibrato effect and permits extinction of the image. The mechanism which initiates, stops, and controls the speed of rotation of each of masks 32 and 33 is controlled by the artist at the keyboard 80.

The overall or total intensity of the projected image is varied by a conventional adjustable aperture or iris 70 similar to that in a camera. Aperture 70 is controlled by the keyboard 80.

The focus of the image is controlled by a device 51 which advances and retreats the projection lens system 50. This motor driven focus mechanism is controlled by the keyboard 80 and provides the artist with the ability to vary the focus from a diffuse and vague image to a sharp image. Where the image forming means is of substantial dimension in the direction of the optical axis such as is the case with a multifaceted transparent crystal, movement of the focusing device will cause different portions of the total available image forming light to be in sharp focus while other portions will become defocused. In other words, excursion of the projection lens system 50 will cause the projected image to change in form as various portions come into and go out of sharp focus. This desirable effect can be maximized by using a projection lens system of large aperture and short focal length to provide a relatively shallow depth-of-field.

The geographic location of the projected image on the screen 6 is determined by the mutual angular positions of mirrors 41 and 42 of the aiming and multiplication system 40. Mirrors 41 and 42 are independently moved by means which are controlled by the keyboard. Mirror 41 is carried by an actuator 45 on an arcuate track 43 which allows mirror 41 to be moved about mirror 42. Mirror 42 is revolved by actuator 44 so as to reflect the image on mirror 41 as the latter moves on the arcuate track 43 result in the ability to revolve the image on the screen. Actuator 45 also can move the mirror 41 with respect to mirror 42 to move the position of the image on the B) relative motions of mirrors 41 and 42 permit translation and rotation of the projected image. These motions are keyboard controlled. In addition to this ability to position and rotate the image, the image can be selectively multiplied into a plurality of such images by virtue of the division of mirror 42 into a plurality of discrete segments 47, each of which is secured to a flexible backing such that flexure of the backing will cause each of mirror segments 47 to lie at a different angle with respect to mirror 41. Each such segment 47 reflects the image which it receives to a geographically different area of the screen. Actuator 46 controls the flexure of mirror 42. Actuators 44, 45 and 46 are controlled by the keyboard. Mirror 41 can also be so segmented with the result of great flexibility in the number and spread of such images. When the segments are brought into the same plane, the image becomes unitary.

The means by which keyboard commands are conveyed to the various devices are not herein detailed. They are schematically represented in the drawing by wires extending from the keyboard 80 to the various devices. The art of producing desired motions in devices remote from a keyboard is a highly developed one. Keyboard musical instruments have for years employed a wide variety mechanical, electromechanical, and pneumatic actuators which produce linear and rotational motions in response to key command. The particular form of actuator employed is a choice among known alternatives which forms no part of the present invention. The keyboard 80 may be fashioned in a manner similar to that of a piano or may be a series of tabs and push-pull knobs such as are well known for organ stop controls.

The apparatus of the present invention thus provides the artist with a great variety of metamorphic imagery which can be changed in color, be moved about the screen and be variably focused.

It is apparent that the control of the image can be derived from an information storage and retrieval device such as a magnetic or punched paper tape playback machine. The storage tape or the like is punched or recorded in response to a properly equipped keyboard upon which the composition is performed and will be preserved for future playback performance wherein the tape information causes actuation of the image varying devices of the present invention. Such storage and retrieval equipment is well known. That used for player or reproducer pianos is readily adaptable to the present purpose.

What I claim is:

1. An optical image projecting system for projecting an image having a plurality of variables under the keyboard control of an operator comprising;

a source of light, means to collect the light into a beam, a control keyboard, means controlled by said keyboard to cyclically vary the intensity of the light, means to form a projectable image comprising a device to randomly deflect and distort the beam of light in a manner dependent upon the relative position of said device with respect to said light beam and means controlled by said keyboard to position said device, filter means for placement in the path of the projectable image, said filter means comprising color filter material having areas which differ in color and intensity from other areas and keyboard controlled means to change is position of the filter material in said path, a lens system to focus and project the light which forms the projectable image, and keyboard controlled positioning means connected to a pair of relatively positionable reflective surfaces located in the path of the projected image to direct the projected image in response to the keyboard controlled position of the reflective surfaces.

2. The image projecting system of claim 1 wherein means which form the projectable image comprise a transparent randomly faceted crystal.

3. The image projecting system of claim 1 wherein the means which cyclically vary the intensity of the light comprises at least two oppositely rotating vanes of opaque material which cooperate to repetitively block and unblock the light beam as the vanes rotate.

4. The image projecting system of claim 3 wherein the peripheries of the vanes are configured such that apertures of variable size and location are formed as the vanes rotate.

5. The image projecting system of claim 1 wherein the filter means comprises a wheel of color filter material which varies in color circumferentially of the wheel and in color intensity radially of the wheel, and the means to change the position of the filter material comprises means to rotatably move the wheel and means to radially move the wheel.

6. The image projecting system of claim 1 wherein means are provided to vary the overall intensity of the image.

7. The image projecting system of claim 1 wherein means are provided to control the focus of the lens system from the keyboard.

8. The image projecting system of claim 1 wherein one of the reflective surfaces comprises a plurality of adjacent mirror segments attached to a flexible support member such that the angular relationship of the mirror segments can be varied by flexure of the flexible member and means are provided to control said flexure from said keyboard whereby the projected image is divided into a plurality of similar images.

9. The image projecting system of claim 1 wherein one of the reflective surfaces is mounted so as to revolve about the optical axis and with respect to the other mirror so as to revolve the projected image.

PO-1050
(5/69)

UNITED STATES PATENT OFFICE
CERTIFICATE OF CORRECTION

Patent No. 3,600,076          Dated August 17, 1971

Inventor(s) EDWARD CARLTON SNYDER

It is certified that error appears in the above-identified patent and that said Letters Patent are hereby corrected as shown below:

Column 1, line 10, "that" should be --the--

Column 4, line 7, after "43" insert --to--

Column 4, line 9, after "the" delete "B)" and insert --screen. Thus, the multiple--

Claim 1, line 17, "is" should be --in--

Signed and sealed this 5th day of September 1972.

(SEAL)
Attest:

EDWARD M. FLETCHER, JR.
Attesting Officer

ROBERT GOTTSCHALK
Commissioner of Patents